Jan. 5, 1932.                S. TSUJITA                    1,840,001
                            DISTANCE METER
                          Filed March 16, 1928

Inventor:
S. Tsujita

Patented Jan. 5, 1932

1,840,001

UNITED STATES PATENT OFFICE

SAJI TSUJITA, OF OSAKA, JAPAN

DISTANCE METER

Application filed March 16, 1928, Serial No. 262,288, and in Japan September 10, 1927.

This invention relates to a distance meter to be used for aeronautics, steam-ships or the like to indicate the distance through which the moving body has travelled. It consists of two motors and one pendulum, the speed of one motor being controlled by movements of the pendulum, and the speed of the other motor being controlled by the number of revolutions of the first motor, the motion of the pendulum being imparted by variation of speed of the moving body.

A control of the speed of the motors is accomplished by changing the electrical resistance in the circuit of each motor. According to this invention such change of resistance for the first motor is made so as to rotate the motor in one or the other direction dependent upon whether the speed of the moving body is increasing or decreasing, and at a speed dependent upon that of the moving body, and when the body is travelling at a constant speed the supply of electric current for the motor is stopped, thus stopping the motor, as a consequence of which action the resultant number of revolutions of the motor indicates the momentary speed of the moving body.

The resistance in the circuit of the second motor is controlled relative to the resultant number of revolutions of the first motor, so that the number of revolutions of the second motor in a certain time indicates the distance through which the moving body has travelled during that time.

The pendulum and the electric resistance for the first motor are placed in an enclosed case which is mounted on the moving body so as to freely turn in any direction in order that it might be maintained in a horizontal position.

Figure 1:
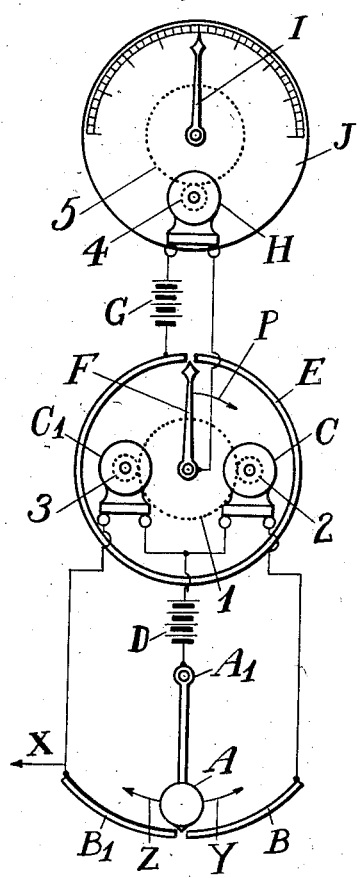
Figure 2:
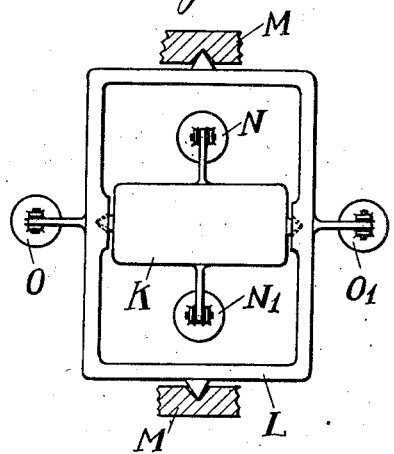
Figure 3:
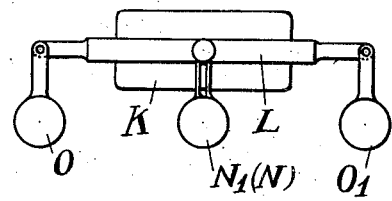

The details of one form of the invention are described with reference to the accompanying drawings, in which Fig. 1 is a diagrammatic view of the principal parts of this invention, Fig. 2 is a plan view of a frame on which the case of this meter is mounted, and Fig. 3 is a side view of the frame.

In Fig. 1, A is a pendulum supported on a pin $A_1$. B and $B_1$ are electric resistances which are inserted in the circuits of motors C and $C_1$, respectively. These motors are called in this specification the first motors. D is an electric source which is electrically connected in a common lead of the resistances B and $B_1$ of the circuits of the motors C and $C_1$, respectively, as shown in the drawings. The motor C turns a hand F in a clockwise direction while the motor $C_1$ turns the same hand in the counter-clockwise direction, through intermediate gears. E is an electric resistance and the hand F contacts with its extreme end on the surface of the resistance. An electric source G supplies current to a motor H through this resistance E and the hand F, as shown in the drawings.

The motor H rotates a hand I on a graduated dial J. Each gearing is shown in the drawings as a pair of single spur gears, but it is a diagrammatic indication, and worm and worm-gears or series of spur gears may be used as the case requires.

The pendulum A and the resistances B and $B_1$ are mounted in a case K which is pivotally supported on a frame L, which is, in turn, pivotally held on a part of the moving body. The supporting points of the case K and those of the frame L being located at right angles and heavy weights N and $N_1$, and O and $O_1$ being hung on each side of the supporting axis of the case and the frame, respectively, the case K is always held horizontally despite any motion of the moving body. The weights O and $O_1$ are so hung from the frame that they take a vertical position even when the longitudinal axis of the moving body gets oblique relative to a horizontal plane. The case K is enclosed in order to keep the pendulum in the case from the effect of air or wind.

The case K is located on the moving body so as to have the pendulum swing in the vertical plane of the moving direction of the moving body.

The operation of this instrument is as follows:—

When the speed of the moving body is increased or decreased, the pendulum A swings in a direction either opposite to, or same as, in the respective case, that of the moving body, due to inertia. Suppose the direction of the moving body is shown by the arrow X. When the moving body is running at a constant speed the pendulum occupies the lowest position due to gravity as shown in Fig. 1. If the body increases its speed the pendulum swings in the direction of the arrow Y due to inertia; while the pendulum swings in the direction of the arrow Z, if the body decreases its speed.

While the pendulum occupies the lowest position, the electric circuits of both the motor C and the motor $C_1$ are open, so that neither C nor $C_1$ rotates. If, however, the pendulum swings in Y direction, it closes the circuit of the motor C so that the latter rotates. This rotation rotates the hand F clockwise through gears 1 and 2. In the same way, if the pendulum swings in Z direction, the hand F is rotated counter-clockwise through the gears 1 and 3. The gears 2 and 3 are so constructed that each of them can rotate the gear 1 in opposite direction, but each of them rotates freely on its axis when the gear 1 is driven by the other gear.

E is an electric resistance, as before mentioned, and forms a part of the circuit of the motor H. When the hand F is standing at the original or zero position, the circuit is open so that the motor H is not rotated. If the hand F rotates in the direction shown by arrow P, the circuit of the motor is closed and hand I is rotated through gears 4 and 5.

Each electric resistance B, $B_1$ and E regulates the speed of the motor C, $C_1$ and H, respectively, in accordance with the positions of the pendulum and of the hand F, while the extent of movements of the pendulum is determined by changes of speed of the moving body.

When the moving body starts or is increasing its speed, the pendulum swings through a certain angle until the body gets to a constant speed when the pendulum resumes its original or zero position due to gravity. While the pendulum is travelling along the resistance B, electric resistance in the circuit of the motor C gradually decreases, and speed of the motor increases gradually. When the moving body gets to a constant speed the pendulum returns back so that the motor stops. The variation of resistance in the circuit of the motor and the time through which the pendulum is closing the circuit depends on the extent of inertia of the pendulum, or the variation of speed of the moving body, so that speed of the moving body can be calculated from total number of revolutions of the motor. The total number of revolutions of the motor is shown by the position of the pin F. In the drawing, the gear 2 is shown as directly coupling with the gear 1, but in practice the motor speed is so reduced by means of a series of reduction gears that the hand F never rotates more than one turn or 360 degrees even when the moving body travels at its maximum speed.

When the moving body decreases its speed the pendulum swings to a certain extent along the resistance $B_1$, and resumes its original position when the body gets to a constant speed of decreased value. The motor C turns the hand F in clockwise direction while the motor $C_1$ turns the same in counter-clockwise direction, so that the position of the hand moves to and fro in accordance with the speed of the moving body.

When the hand F is situated at the original or zero position, the circuit of the motor H is open. If the hand F takes a position on the resistance $B_1$, the circuit is closed and the motor H revolves at a speed corresponding with the resistance in the circuit. Since the hand F always closes the circuit of the motor H when the moving body is running, and the position of the hand F is determined by the speed of the body, the distance through which the body travelled is known by the number of revolutions of the motor H, which is indicated on the graduated dial by an indicator or counter I.

With this instrument the distance of the body travelled in its forward direction is known by the indicator I. If another instrument is provided on the body in transverse position to the other one, the travelled distance of the body in transverse direction is known in the same way.

I claim:

1. A distance meter comprising a pendulum, an electric motor system, another electric motor, circuits provided one for said motor system and one of the said electric motors, each circuit comprising means for varying the resistance thereof, the said motor system comprising means whereby the effective direction of action thereof may be changed from a forward to a reverse direction or vice versa dependent upon the corresponding resistance varying means, the said last-mentioned resistance varying means causing the rotation of the motor system at a speed dependent upon the resistance in the circuit, means for regulating the resistance in the circuit of the electric motor and controlled by the operation of the said motor system, and means for indicating the total number of rotations of the said electric motor.

2. A distance meter comprising a pendulum, three motors, circuits for the said motors, and containing resistance regulating means, a pendulum, means controlled by the said pendulum for varying the said resistance varying means in the circuit in either one of two of the said three motors, dependent upon whether the speed of the device being measured increases or decreases, whereby to effect rotation of the respective motor at a speed in consonance with the particular position of the resistance varying means, means for regulating the resistance varying means in the circuit of the third motor as a consequence of the rotation of either of the first two motors, and means to indicate the total number of rotations of the said last mentioned motor.

3. In a meter for indicating the distance travelled by a moving body on which it is installed, in accordance with variations in the direction of travel of the body, electric motors, a source of current supply in circuit with each of the motors, an indicator unit for indicating the distance travelled in a direct forward direction, operative connection between the indicator unit and one of the motors for actuating the indicator unit upon energization of the respective motor, a circuit closer in said circuit comprising an open resistance element, an indicator unit including an indicator pointer, the pointer being in circuit with one side of the source of current supply for said motor and the resistance element having one end in circuit with the other side of the source of supply, the pointer, in its movement from a neutral position, between the ends of the resistance element, being arranged to contact with said resistance element to close the circuit through said motor, with a variation of strength of current supply depending upon the distance of movement of the pointer element and the mass of the resistance element brought into circuit in accordance with the extent of such movement of the pointer, a pendulum balanced to normally assume a perpendicular position, a source of supply for the other motor, the pendulum being in circuit with one side of the said source of current supply and, in its neutral position, being out of contact with the resistance element, and, when the resistance element is displaced with respect thereto through change, from a forward course of travel, of the body, with respect to which the element is stationary, being in contact with said resistance element whereby to vary the strength of the current supplied to the last mentioned motor, and operative connection between the last mentioned motor and the said pointer element for effecting movement thereof with respect to the first mentioned resistance element.

In testimony whereof I have signed my name to this specification.

SAJI TSUJITA.